(12) United States Patent  (10) Patent No.: US 7,237,569 B2
Shieh  (45) Date of Patent: Jul. 3, 2007

(54) BALL CHECK VALVE

(75) Inventor: Ching-chen Shieh, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 149 days.

(21) Appl. No.: 11/074,652

(22) Filed: Mar. 9, 2005

(65) Prior Publication Data

US 2006/0201557 A1   Sep. 14, 2006

(51) Int. Cl.
    F16K 15/04   (2006.01)
(52) U.S. Cl. .................. 137/533.13; 137/533.15; 137/533.19; 137/548
(58) Field of Classification Search .......... 137/533.11, 137/533.13, 533.15, 533.19, 539, 539.5, 137/549, 550; 210/136
    See application file for complete search history.

(56) References Cited

U.S. PATENT DOCUMENTS

| 1,025,977 | A | * | 5/1912 | Henderson | 137/533.13 |
| 1,189,814 | A | * | 7/1916 | Hayes | 137/533.11 |
| 1,461,439 | A | * | 7/1923 | Burgin | 137/533.13 |
| 2,294,568 | A | * | 9/1942 | Neilsen | 137/533.15 |
| 2,682,281 | A | * | 6/1954 | Ecker | 137/533.13 |
| 2,723,679 | A | * | 11/1955 | Harris et al. | 137/533.13 |
| 2,972,412 | A | * | 2/1961 | Lundeen | 210/136 |
| 3,059,667 | A | * | 10/1962 | Coceano | 137/533.13 |
| 4,100,935 | A | * | 7/1978 | Harnish | 137/533.11 |
| 4,513,778 | A | * | 4/1985 | Vadasz | 137/533.11 |
| 5,095,940 | A | * | 3/1992 | Saur et al. | 137/533.11 |
| 5,653,258 | A | * | 8/1997 | Schwarz | 137/533.19 |
| 5,797,426 | A | * | 8/1998 | Powell | 137/533.11 |

* cited by examiner

Primary Examiner—John Rivell
(74) Attorney, Agent, or Firm—Troxell Law Office, PLLC

(57) ABSTRACT

A ball check valve includes a mounting base, a valve cage and a valve ball. The valve cage is mounted on the mounting base and includes a base, multiple holding fingers and a filtering and regulating device. The holding fingers are formed on the base and are arranged to form a valve chamber. The filtering and regulating device is mounted on the holding fingers, includes multiple curved ribs respectively mounted on a pair of corresponding holding fingers and are arranged in parallel with the base of the valve cage to filter impurities in and regulate fluid flow through the ball check valve. The valve ball is movably mounted in the valve chamber to selectively open and close the check valve. Consequently, the ball check valve can not only service as a check valve, but also service as a filter and regulator for the fluid flow.

6 Claims, 3 Drawing Sheets

BALL CHECK VALVE

BACKGROUND OF THE INVENTION

1. Field of the Invention

The present invention relates to a check valve, and more particularly to a ball check valve that has features of filtering impurities and regulating simultaneously from a fluid flow through the check valve.

2. Description of Related Art

Check valves are generally employed to plumber systems when it is necessary to limit fluid flow in only one direction. Ball check valves use a ball as the valve member, which provides a precision and long lasting part at low cost.

With reference to FIG. 3, a conventional ball check valve 50 is suitable for being mounted in a conduit 60 and comprises a valve ball 51 and a valve cage 52 or retainer. The valve ball 51 is movably mounted and held in the valve cage 52.

The valve cage 52 is mounted in the conduit 60 and has a cage base 53 with multiple holding fingers 54. The cage base 53 is annular and has a top, a bottom and a central hole 55. The central hole 55 is defined completely through the cage base 53 and has a top inclined edge. The top inclined edge services as a valve seat 56 on which the valve ball 51 is abutted to close the check valve 50.

The holding fingers 54 are formed integrally from the top of the cage base 53 and are arranged in parallel with respect to each other. Each holding finger 54 has a distal end with an inward stop surface 57. Each inward stop surface 57 is inclined so that the valve ball 51 will be limited and held in the valve cage 53 when the check valve 50 is open.

However, the conventional ball check valve 50 only has one feature of limiting the fluid flow in the conduit 60 in one direction. The conventional ball check valve 50 does not have any feature of filtering and regulating the fluid flow. Therefore, the practical usage of the conventional ball check valve 50 is restrictive.

Furthermore, because the valve seat 56 is an inclined surface, a contact relationship between the valve ball 51 and the valve seat 56 is approximate to a surface contact when the valve ball 51 seats on the valve seat 56. The surface of the valve seat 56 is large and is easy to be contaminated by the impurities in the fluid flow. At such a state, the check valve 50 cannot be completely closed because the valve ball 51 cannot exactly contact with the valve seat 56. Leakage will occur between the valve ball 51 and the valve seat 56 through the central hole 55.

To overcome the shortcomings, the present invention provides an improved ball check valve to mitigate or obviate the aforementioned problems.

SUMMARY OF THE INVENTION

The main objective of the present invention is to provide a ball check valve with a feature of filtering and regulating a fluid flow through the ball check valve.

Another objective of the present invention is to provide a ball check with a simple structure, which renders ease to assembly and low manufacturing cost.

A ball check valve in accordance with the present invention comprises a mounting base, a valve cage and a valve ball. The mounting base has a central hole. The valve cage is mounted on the mounting base and comprises a base, multiple holding fingers and a filtering and regulating device. The base of the valve cage has a through hole defined concentrically with the central hole of the mounting base. The holding fingers are formed on the base and are arranged along the through hole forming a valve chamber. Each of the holding fingers has a bent distal end and a stop formed adjacent to distal end of the corresponding holding finger. The filtering and regulating device is mounted on the holding fingers and comprises multiple curved ribs. The curved ribs are respectively mounted on a pair of corresponding holding fingers and are arranged in parallel with the base of the valve cage to filter impurities from and regulate fluid flow through the ball check valve. The valve ball is movably mounted in the valve chamber in the valve cage to selectively open and close the central hole of the mounting base.

The mounting base further has an inner annular lip formed concentrically with the central hole of the mounting base, whereby the valve ball abuts on the inner annular lip to close the central hole.

Consequently, the ball check valve in accordance with the present invention not only services simply as a check valve, but also services as a filter and regulator for the fluid flow. Furthermore, since the valve ball abuts on the inner annular lip to close the ball check valve and a contact surface between the valve ball and the annular lip is smaller than the inclined valve seat of the conventional check valve, the annular lip is not easy to be contaminated. Leakage between the valve ball and the valve seat is overcome by present invention. The valve ball will not be easy to be clogged by the contaminated valve seat.

Other objectives, advantages and novel features of the invention will become more apparent from the following detailed description when taken in conjunction with the accompanying drawings.

DETAILED DESCRIPTION OF PREFERRED EMBODIMENT

Figure 1:
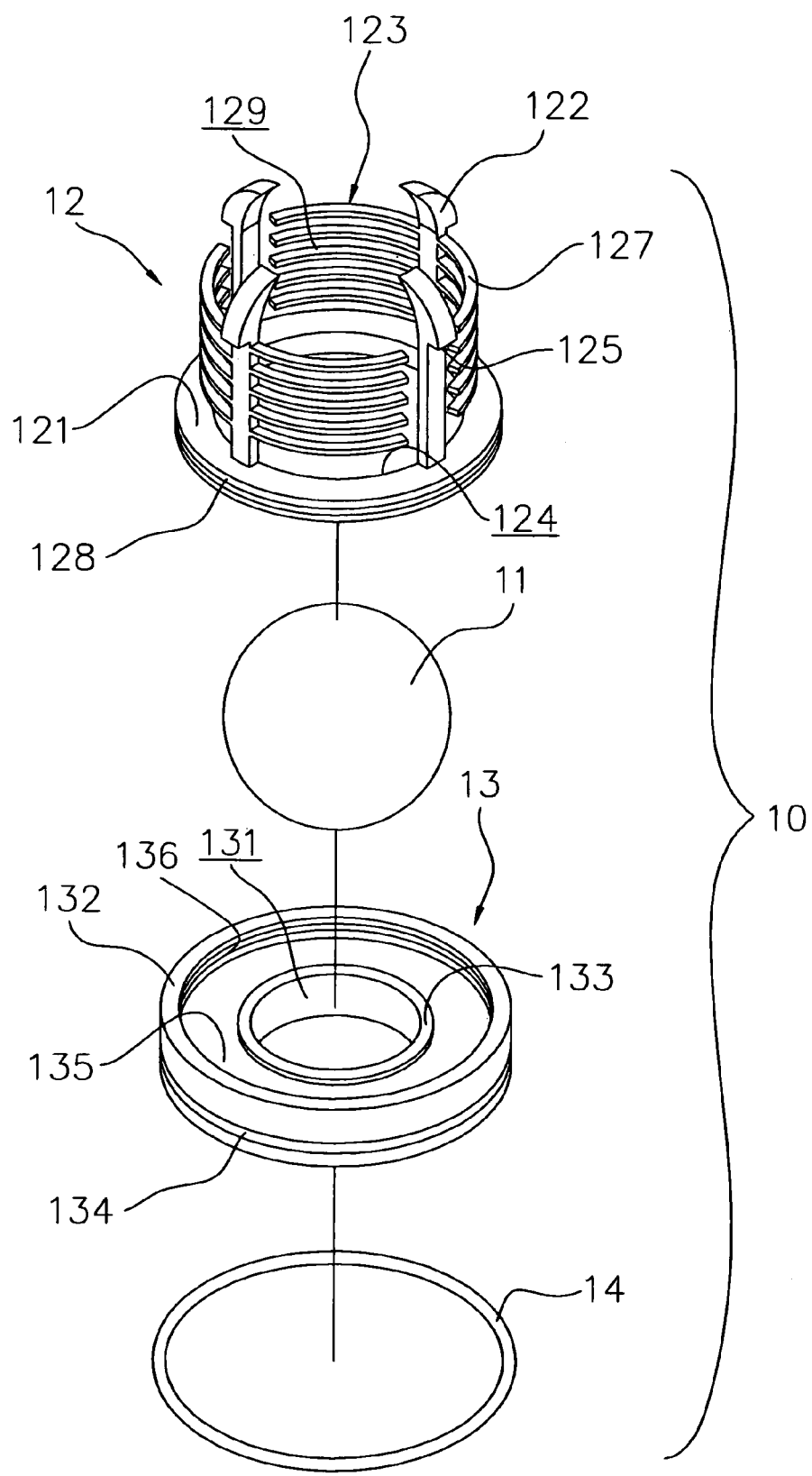
FIG. 1 is an exploded perspective view of a ball check valve in accordance with the present invention.
Figures 2A, 2B, 2C:
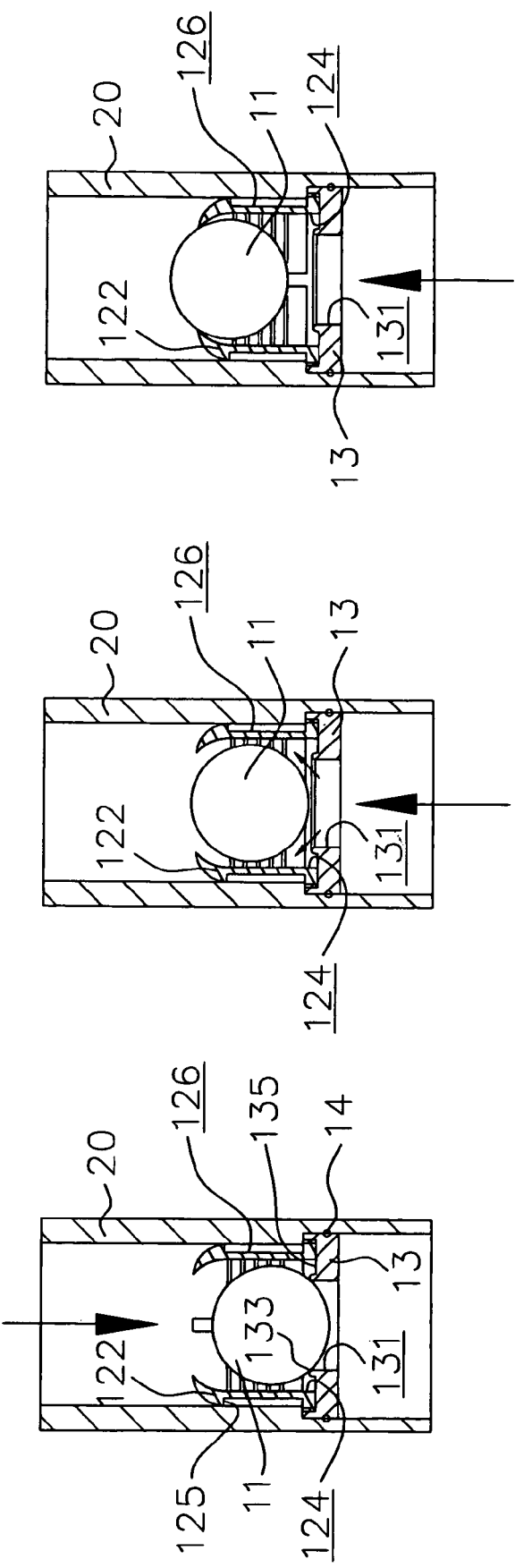
FIG. 2a is an operational sectional view of the ball check valve in FIG. 1 when the check valve is closed.
FIG. 2b is an operational sectional view of the ball check valve in FIG. 1 when the check valve is initially opened.
FIG. 2c is an operational sectional view of the ball check valve in FIG. 1 when the check valve is completely opened.
Figure 3:
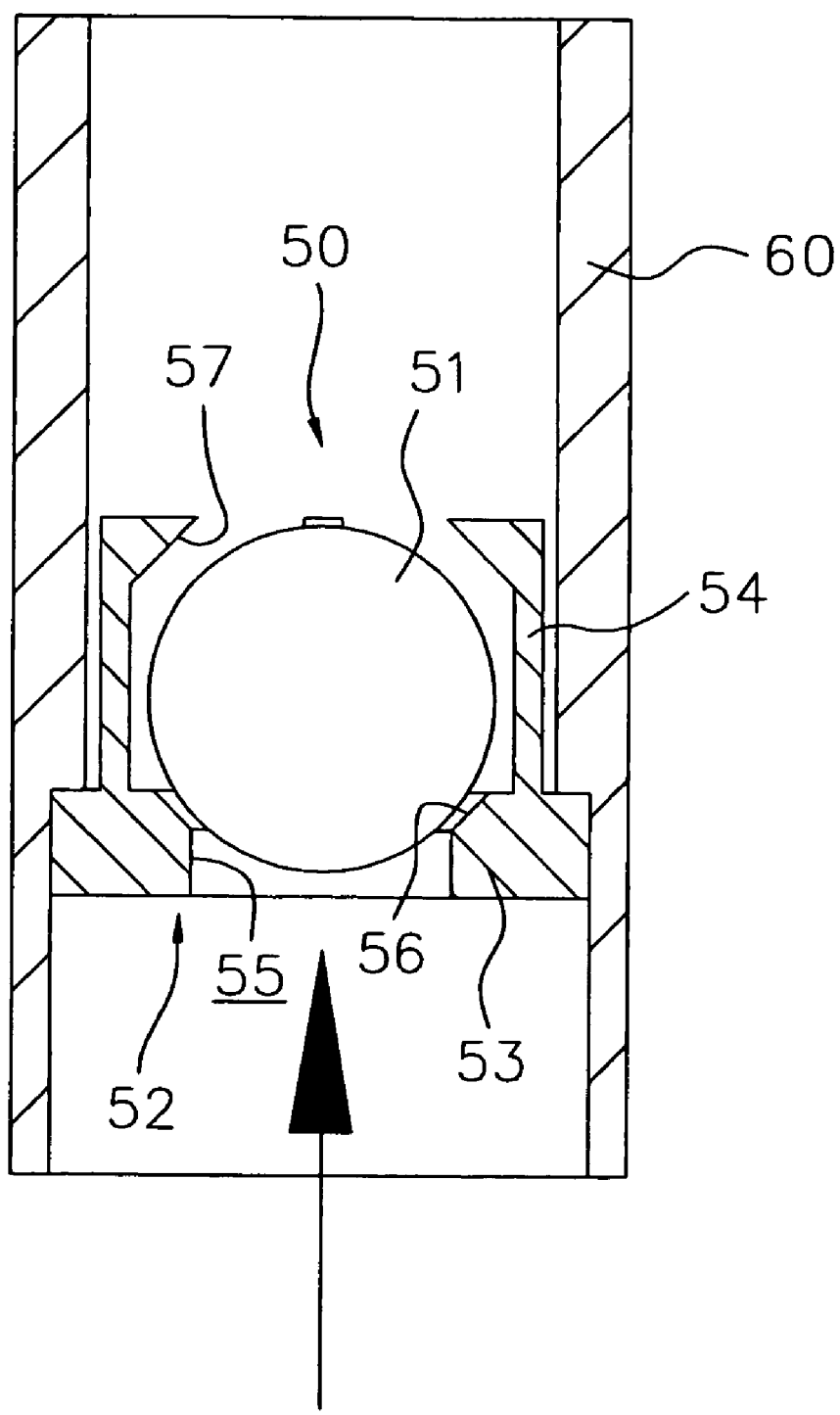
FIG. 3 is sectional view of a conventional ball check valve in accordance with prior art.

With reference to FIGS. 1 and 2a, a ball check valve 10 in accordance with the present invention is suitable for being mounted in a fluid conduit 20 and comprises a valve ball 11, a valve cage 12, a mounting base 13 and a sealing member 14. The fluid conduit 20 can be connected to faucets, valves in a toilet water tank, plumbing systems or pneumatic systems.

The valve ball 11 is movably mounted and held in the valve cage 12. The valve cage 12 is mounted on the mounting seat 13. The sealing member 14 is attached to the mounting base 13.

The valve cage 12 comprises a base 121, multiple holding fingers 122 and a filtering and regulating device 123. The base 121 is annular and has a top (not numbered), a bottom (not numbered), a through hole 124 and an exterior surface (not numbered). The holding fingers 122 are formed integrally on the top of the base 121 and are arranged along the through hole 124. The arrangement of the holding fingers 122 forms a valve chamber 129, and the valve chamber 129 communicates with the through hole 124. Therefore, the valve ball 11 is movably mounted and received in the valve chamber 129 through the through hole 124.

Each holding finger 122 has a distal end (not numbered) and a stop 125. The distal ends of the holding fingers 122 are bent inward to narrow a top opening of the valve chamber 129 so that the valve ball 11 is held in the valve chamber 129. The stop 125 is protruded outwardly adjacent to the distal end of the holding finger 122. The stops 125 of the holding fingers 122 will abut on the interior of the conduit 20 when the ball check valve 10 is mounted in the conduit 20, which forms a fluid passage 126 between the holding fingers 122 and the interior of the conduit 20. The stops 125 also prevent the holding fingers 122 from being excessively deformed by the valve ball 11. Therefore, the valve ball 11 will not disengage from the valve cage 12.

The filter and regulating device 123 is mounted on the holding fingers 122 and comprises multiple curved ribs 127. The curved ribs 127 are respectively mounted on a pair of corresponding holding fingers 122 and are arranged to be parallel with the top of the base 121. Ends of each of the curved ribs 127 are respectively extended toward an adjacent holding finger 122.

The base 121 further has a first connection portion 128. The first connection portion 128 is formed on the exterior surface of the base 121 and can be an exterior thread.

The mounting seat 13 is annular and has a central hole 131, an outer annular lip 132, an inner annular lip 133, an annular groove 134 and a collection recess 135 between the lips 132,133. The outer and the inner annular lips 132, 133 are formed concentrically with the central hole 131. The outer annular lip 132 has a second connection portion 136 that connects to the first connection portion 128 of the base 121. The second connection portion 136 can be an interior thread engaging with the exterior thread of the first connection portion 128. The inner annular lip 133 services as a valve seat on which the valve ball 11 is abutted.

The sealing member 14 can be an O-ring and is mounted and held in the annular groove 134 in the mounting seat 13. The sealing member 14 prevents leakage between the mounting seat 13 and the conduit 20. Furthermore, a quantity of the sealing member 14 may be multiple.

With reference to FIG. 2a, the valve ball 11 is pressed downward by the fluid flow (as the downward arrow indicated), and the valve ball 11 seats on the valve seat of the inner annular lip 133 to close the central hole 131. The check valve 10 is closed and stops the movement of the fluid flow.

With reference to FIGS. 2b to 2c, the valve ball 11 is pushed upward by the reverse fluid flow (as the upward arrow indicated), and the valve ball 11 disengages from the valve seat of the inner annular lip 133 to open the central hole 131. The bent distal ends of the holding fingers 122 stop the valve ball 11 and retain the valve ball 11 in the valve cage 12. The fluid flow passes the check valve 10 through the central hole 131 and fluid passage 126. Thus, the check valve 10 is opened.

The curved ribs 127 of the filtering and regulating device 123 filters and regulates the fluid flow as the fluid flow passes through the arranged curved ribs 127. The filtered impurities will be accumulated in the collection recess 135 when the ball check valve 10 is closed and the movement of the fluid flow is stopped. The accumulated impurities are easy to be removed from the check valve 10 by disassembling the mounting base 13 from the valve cage 12.

Even though details of the structure and numerous advantages of the present invention have been set forth in the foregoing description, the disclosure is illustrative only. Persons skilled in the art will recognize that the invention can be practiced with modifications, within the spirit and scope of the appended claims.

What is claimed is:

1. A ball check valve comprising:
   a mounting base having a central hole;
   a valve cage mounted on the mounting base, and the valve cage comprising:
      a base having a through hole defined concentrically with the central hole of the mounting base;
      multiple holding fingers formed on the base, arranged along the through hole and forming a valve chamber, each of the holding fingers having a bent distal end and a stop formed adjacent to the corresponding bent distal end; and a filtering and regulating device mounted on the holding fingers;
   a valve ball movably mounted in the valve chamber in the valve cage to operationally open and close the central hole of the mounting base; and
   at least one sealing member mounted around the mounting base,
   wherein the filtering and regulating device comprises multiple curved ribs, and the curved ribs are respectively mounted on a pair of corresponding holding fingers and are arranged in parallel with the base of the valve cage.

2. The ball check valve as claimed in claim 1, wherein the mounting base further has an exterior groove to hold a respective one of the at least one sealing member.

3. The ball check valve as claimed in claim 1, wherein each of the at least one sealing member is an O-ring.

4. A ball check valve comprising:
   a mounting base having a central hole;
   a valve case mounted on the mounting base, and the valve cage comprising:
      a base having a through hole defined concentrically with the central hole of the mounting bas;
      multiple holding fingers formed on the base, arranged along the through hole and forming a valve chamber, each of the holding fingers having a bent distal end and a stop formed adjacent to the corresponding bent distal end; and a filtering and regulating device mounted on the holding fingers;
   a valve ball movably mounted in the valve chamber in the valve cage to operationally open and close the central hole of the mounting base; and
   at least one sealing member mounted around the mounting base.
   wherein the mounting base further has an inner annular lip formed concentrically with the central hole of the mounting base, whereby the valve ball abuts on the inner annular lip to close the central hole; an outer annular lip formed concentrically with the central hole of the mounting base; and a collection recess formed between the inner and the outer annular lips.

5. The ball check valve as claimed in claim 4, wherein the base of the valve cage further has an exterior surface and a first connection portion formed on the exterior surface; and the outer annular lip of the mounting base has a second connection portion connected to the first connection portion.

6. The ball check valve as claimed in claim 5, wherein the first connection portion is an exterior thread, and the second connection portion is an interior thread engaging with the exterior thread.

* * * * *